Nov. 9, 1965  R. W. ANDREASSON  3,216,107
FLUID COOLED REAMER WITH LAND CHANNEL
Original Filed Jan. 8, 1963  2 Sheets-Sheet 1
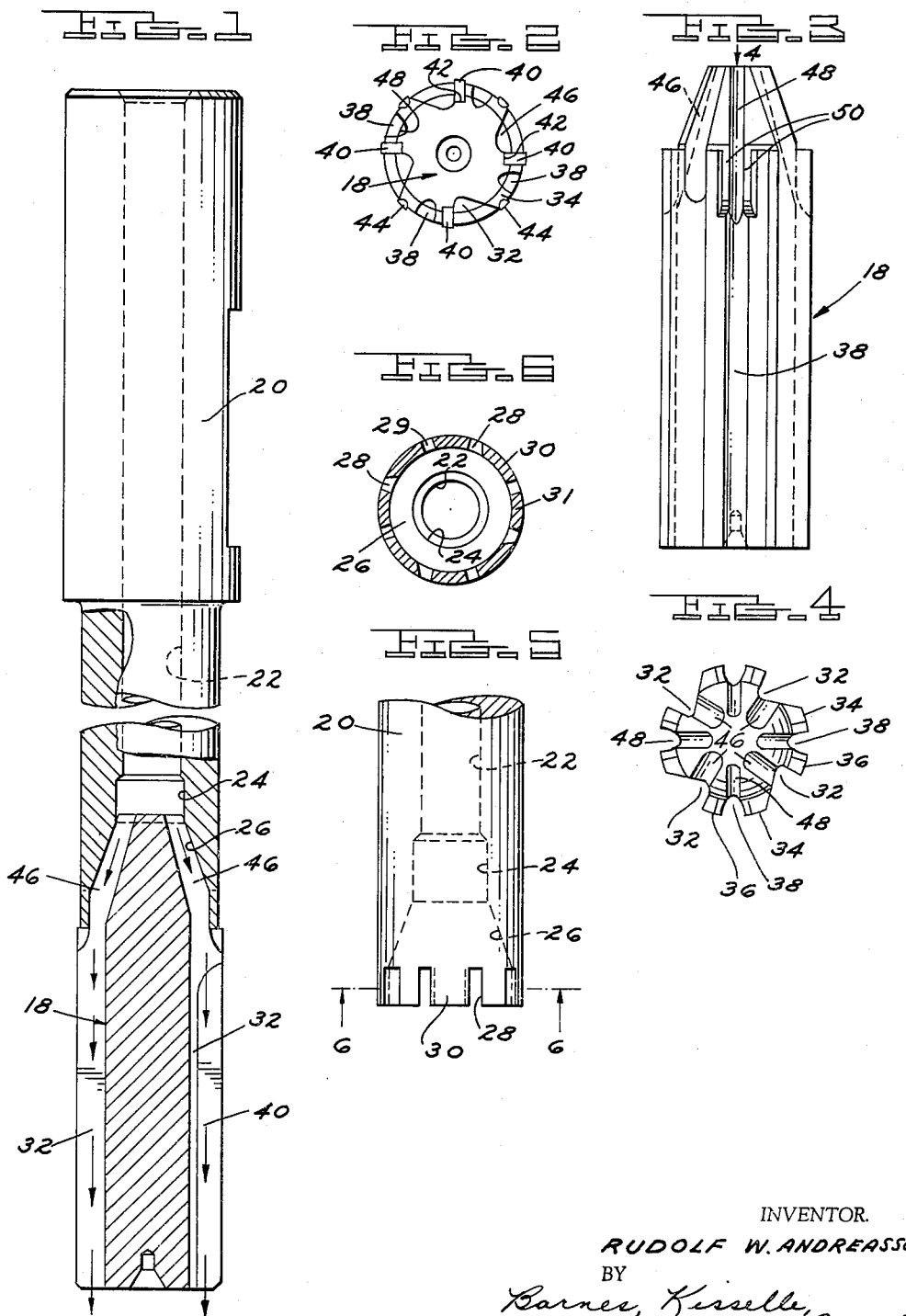
INVENTOR.
RUDOLF W. ANDREASSON
BY
Barnes, Kisselle,
Raisch & Choate
ATTORNEYS

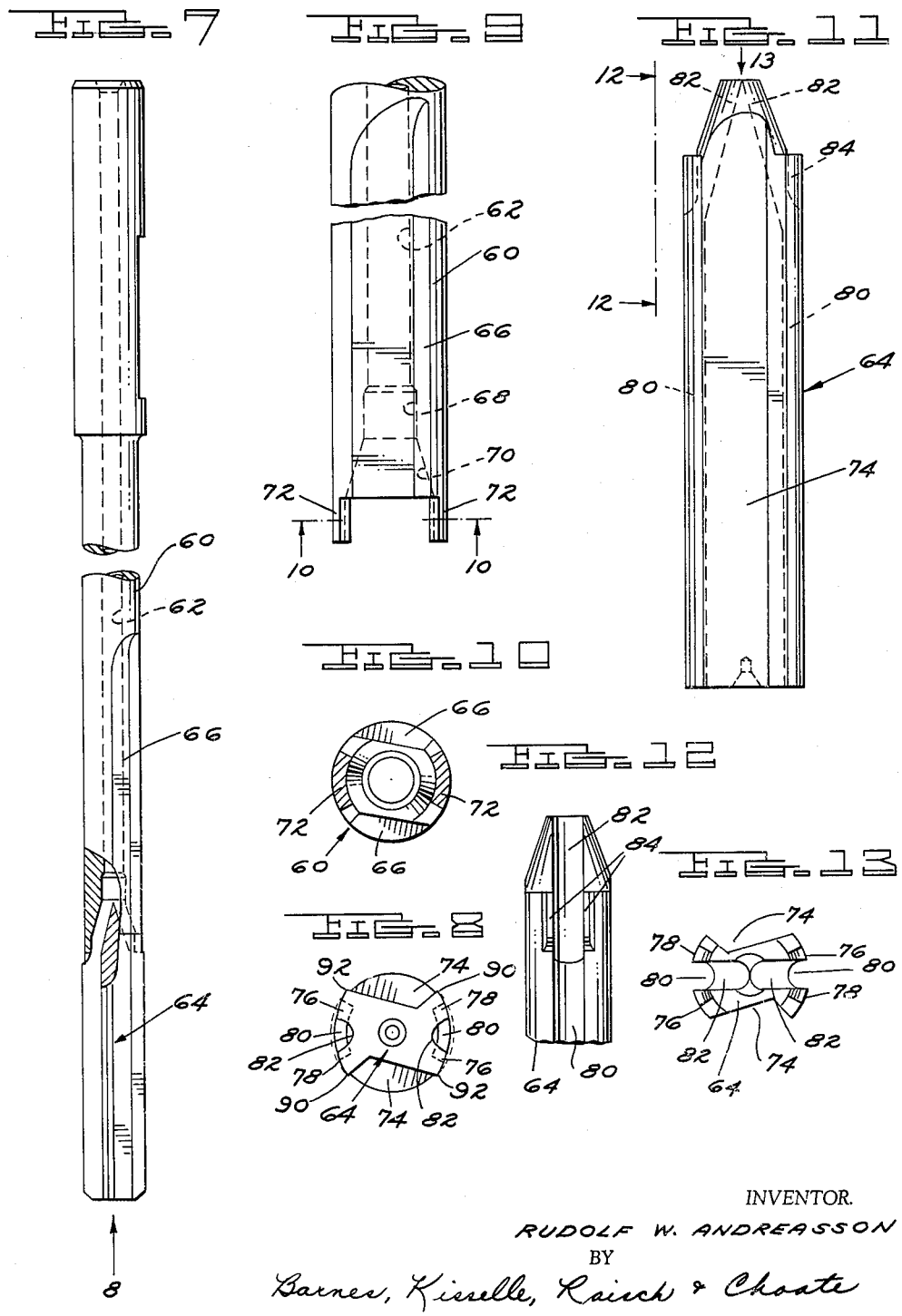

United States Patent Office 3,216,107
Patented Nov. 9, 1965

---

3,216,107
FLUID COOLED REAMER WITH
LAND CHANNEL
Rudolf W. Andreasson, P.O. Box 174, Birmingham Mich.
Continuation of abandoned application Ser. No. 250,076,
Jan. 8, 1963. This application May 27, 1965, Ser. No.
463,465
3 Claims. (Cl. 29—567)

This is a continuation of application Serial No. 250,076, January 8, 1963, and now abandoned.

This invention relates to a reamer and more particularly to the type of reamer which is used for reaming of blind holes although it may also be adapted to reamers which are used for open ended holes. Reference is made to my Patent No. 3,055,239, issued September 25, 1962, and to my co-pending application Serial No. 206,972, filed July 2, 1962, now Patent No. 3,169,417, issued February 16, 1965, wherein there are disclosures of reamers of the general type under consideration.

It has been common in the drill and reamer art to provide coolant through a center passage in the shank. In some cases it has been discharged into the flute at a distance from the tip to cause a flushing down of the chips as well as lubrication and cooling. In other cases, in a blind hole, the coolant is discharged at the end of the tool so it will flow back along side flutes to wash chips up along the flutes to the entrance of the hole.

Whether a tool has been a single flute or multiple flute tool, it has also been common practice to provide clearance on the lands between the flutes. This clearance is sometimes created by brazing wear strips on the lands at the leading and trailing edges of the land. More often the clearance is ground into the land leaving a contact strip at the leading and trailing edge of the land. Due to deflection from grinding wheel pressure, the trailing surface of the land is subject to more pressure and is of consequent greater effective diameter than the leading surface which gets the initial contact of the wheel before wheel pressure perceptively deflects the tool. With any carelessness at all in the grinding, the discrepancy between the contact surfaces of the land may be as much as .001" or more. This can cause a burning or galling or rubbing of the hole wall since the cutting or sizing edge is smaller than the trailing edge. On the other hand, with proper coolant and lubrication, this discrepancy can create a beneficial effect in that the larger trailing edge can coin, burnish, or "bearingize" the surface to improve the finish materially.

Accordingly, it is an object of the present invention to provide a hole forming or enlarging tool wherein an insert can be associated with a tool shank in a way to provide adequate lubrication of the cutting tip, where this is required, and also adequate cooling and lubrication of the bearing surfaces of the tool to provide improved wall surface results and avoid any danger of rubbing or burning.

It is a further object to provide a combination tool shank and bit insert wherein a positive drive is provided between the two which also adapts to the furnishing of adequate coolant both to the cutting tip and to the wall of the hole. Another feature of the construction is the controlled flow which eliminates waste of the coolant and greatly reduces the need for guide bushings.

It is also an object to provide a reamer which is relatively inexpensive to manufacture and one in which a hard cutting insert can be readily applied to an inexpensive reamer shank to provide an economical tool.

Other objects and features of the invention relating to details of construction and operation will be apparent in the following description and claims.

Drawings accompany the disclosure and the various views thereof may be briefly described as:

FIGURE 1, an elevation of the reamer partially in section showing one modification of the device.

FIGURE 2, an end view of the reamer of FIGURE 1.

FIGURE 3, a side elevation of the reamer insert.

FIGURE 4, a top view of FIGURE 3 at line 4.

FIGURE 5, a side elevation of the shank end with the reamer separated.

FIGURE 6, a sectional view on line 6—6 of FIGURE 5.

FIGURE 7, a side elevation of a modified structure showing a two-fluted device.

FIGURE 8, an end view on line 8—8 of FIGURE 7.

FIGURE 9, a view of the shank end with the reamer insert separated therefrom.

FIGURE 10, a sectional view of the shank on line 10—10 of FIGURE 9.

FIGURE 11, an enlarged elevation of the reamer insert of FIGURE 7.

FIGURE 12, a side view of the reamer insert on line 12—12 of FIGURE 11.

FIGURE 13, a top end view of the reamer insert taken on line 13 of FIGURE 11.

Referring to the drawings:

In FIGURE 1, a reamer insert 18 is shown with a shank 20 which is in the form of a steel tube having a central opening 22, the opening at the end of the shank having a slight enlargement 24 leading to a tapered recess 26 as shown in FIGURE 5. The end of the shank to which the reamer insert is joined has an interdigital formation formed by alternate slots 28 and 29 and alternate skirts 30 and 31. It will be noted (FIGURE 6) that the slots 28 have one angled side for purposes to be later noted. An end view of the insert (FIGURE 3) to be applied to shank 20 illustrates the shape to include a series of flutes 32 separated by land portions which for convenience will be referred to as 34–36, these portions being separated by a channel 38. In the embodiment shown, each flute 32 terminates in a cutting and wear land 40 which can be a strip of carbide brazed into a recess 42 at the edge of lands 36. A wear strip 44 is also brazed to a small axial groove on the surface of the lands 34.

As shown in FIGURES 3 and 4, the flutes 32 connect at the top to an angled channel 46 while the channels 38 are extended angularly toward the upper tip of the reamer in short channels 48. When the end of the shank 20 is joined with the shank end of the insert 18, the various skirt-like digital projections will interfit with the respective flutes 32 and channels 38 of the insert to provide positive engagement and the parts are joined together by a suitable adhesion method such as brazing. In this mating operation, it will be seen that the skirts 30 will enter the wider flute formations 32 while the skirts 31 will enter the narrower channel formations, the channel formations being suitably widened at the shank end to provide recesses 50 to receive the edges of these skirts. Thus, the hard insert which may be carbide or high speed steel is mechanically engaged with the shank. In addition, each flute 32 is connected to the center opening 22 of the shank 20 through the openings 46 and each channel in land 36—36 is connected also to the center opening through the short channels 48.

The reamer inserts, of course, are ground to size and finished by the use of a grinding wheel. It has been detected that in this grinding operation, there is a certain deflection phenomenon which takes place particularly in the smaller sizes so that in the initial contact of the grindwheel with the flute portion being ground, the dimension will be less than the trailing portion of the flute which is ground because, as the grinding wheel progresses circumferentially on the land, the deflection becomes greater and thus the actual material which is ground away is less. Thus, a situation develops where the actual cutting edge of a member 40 may be of smaller diameter than the trailing edge of that same cutting piece.

For this reason, in difficult work where finish is extremely important, the present design is ideal since not only can the cutting edge be flooded with coolant and lubricant through the channels 46 and the flutes 32, but also the trailing edges by which the reamer is supported in the hole can be equally well lubricated and protected by a force-flow through channels 48 and 38. It will be seen that the angled channels 48 are no longer than the channels 46. The reason for this is that it is desirable that the fluid flowing through the channels 46 will be deflected by the skirts 30 to dissipate the outward component of the coolant and flow axially straight down the flute 32, thus insuring that the fluid reaches the end of the reamer in sufficient supply to lubricate the working end as well as the edges. On the other hand, with respect to channel 48 and channel 38, the lubricant is particularly adapted for the protection of the walls of the hole relative to the lands of the reamer.

Thus, the longer channel 48 is still protected by a skirt portion 31 of the shank and the fluid will flow primarily down the channel to the end of the tip. Since the channel 48 is longer than channel 46 and since the channel 38 is shallower than the flute 32, the fluid carried therein is nearer the wall surfaces of the hole and thus, together with the centrifugal force of operation, will force the lubricant between the lands and the walls to perform its function of cooling and lubricating. Thus, a superior job is performed by reason of the tool design. The unit shown in FIGURES 1 to 4 is especially adapted for open-end holes.

In FIGURES 7 to 13, an embodiment of a reamer construction is shown which is particularly adapted for use with blind holes where it is essential that the chips be flushed out by the coolant as the reamer progresses. A reamer shank 60 having a central passage 62 is joined with an insert 64. The reamer shank has a relatively long flute 66 formed therein to permit escape of chips. This flute can extend as far up along the shank as is necessary to allow the chips to flow out of the hole being reamed. The center hole of the shank 60 is enlarged slightly at 68 and tapered at 70 to the opening of the shank, this shank being provided with two projecting skirt portions 72 on opposite sides of the shank.

The insert is provided with two relatively wide flutes 74 separated by split land portions 76–78 lying on either side of axial surface channels 80, these channels being angled inwardly at the top portion of the insert in short channels 82. These short channels 82 are widened to provide side recesses 84 which receive, in assembly, the edges of the skirts 72. Each flute 74 of the insert can connect at the shank end with a similar flute 66 in the shank. When the parts are brazed together, it will be seen, of course, that the skirts 72 are mechanically engaged with the end of the insert and the channels 82 connect to the central passage 62 of the shank. The walls of the shank blend in with the tapered top end of the insert 64 so that the respective flutes of the insert and the shank are joined with no connection to the interior passage 62 of the shank.

In FIGURE 8, the lands 76–78, interrupted by the grooves 80, are shown with clearance ground into the surfaces, the leading edge surface 90 and the trailing edge surface 92 being the wall contacting surfaces in the operation. It is these surfaces which may vary in diameter, as above described, and it is these surfaces which receive the direct lubrication from channels 80 which in turn furnish abundant quantity of coolant to the tip of the tool and assist in the flushing out of the chips through flute 66.

Thus, all the coolant will flow from the shank through the channels 82–80 and reach the end of the reamer in such a way that the end will be flooded with coolant and carry the chips up through the larger flutes. In addition, coolant coming down through these channels will cool and lubricate the guiding lands 94 and 96 of the reamer and, as pointed out above, the trailing land 96, which, as a result of grinding, is somewhat larger than the leading land 94, is well lubricated with this arrangement so that any burning or galling of the walls of the hole is prevented. However, the burnishing or bearingizer effect is accomplished by these trailing lands which have contact with the walls of the hole and which, when properly lubricated, may improve a finish from a 20-micro finish to a 10-micro finish.

It will be noted that in both the above described embodiments, looking at an end view of the tip toward the shank, it is possible to see a direct straight line relationship through the channels and flutes into the passages within the skirt portions of the shank. In FIGURE 2, for example, the flutes 32 open directly into the passages 46 as viewed from the end, and the channels 38 open directly into the passages 48. Similarly, in FIGURE 8, the flutes 80 open directly into the passages 82.

It will be seen from the above description that the design of the tool is such that it is adaptable not only to extremely large tools but also to extremely small tools. Many previous designs have required a drilling of the insert in order to provide the coolant holes which give access to the outside of the tool. The present device has no holes drilled but simply requires the outer flutes to be carried into the surface of the tapered end and thus connect up to the axial passage of the shank. Thus, extremely small tools can be provided with ample coolant passages.

Another advantage of the device lies in the fact that a relatively large area of metal-to-metal contact is provided in the joint between the shank end and the bit with the interlocking skirts being brazed to the walls of the slots formed for them and the land portions of the tapered insert being in contact with the tapered recess of the shank. The tool has, therefore, the advantage of an interlock drive as well as a large area of brazing surface.

Another advantage of the above described structure lies in the fact that it may be used for what are called stepped-tools, that is, tools which have, for example, three different diameters increasing from the tip up to the shank. With the flute extending from the coolant passage right down to the tip and with the direction of the coolant being such that it clings closely to the flute, it is possible to use much longer sections for each stepped portion without concern as to whether the coolant will hit the cutting edge and thus the tool life is much longer.

With the disclosed structure, the coolant moves straight down the flutes and even in a horizontal tool the coolant will be shooting right straight off the end of the tool as it projects toward the hole to be drilled or reamed. Thus, advantage can be taken of the centrifugal force which will move the fluid out against the walls of the hole being enlarged or finished; and because of the construction, there will be an assurance that there will be ample cooling and lubricating liquid through the length of the tip available for cooling the cutting edges as well as lubricating the walls of the hole. In addition, in the structure shown in FIGURES 1 to 6, for example, it will be noted that there is coolant flowing on each side of the cutting lands. Thus, even a high speed operation can be accomplished without overheating of the cutting portions of the tool.

Another object and advantage of the design above described is found in the above features which include the coolant flowing down the flute and clinging to the tool. This not only reduces the need for guide bushings which are in some cases provided primarily to hold in the coolant, but it also greatly increases the advantage of the device when in step drilling or reaming the small portion of the tip must work before the other portions reach contact with the surfaces which they are to operate on. With the fluid moving right down to the tip, it is available as soon as any portion of the tip starts its work. Thus, a guide bushing which is large enough for the biggest portion of the tip cannot aid the small portion of the tip and this is no longer required with the present construction.

Similarly, if a tool is being used on an intricate casting, for example, where there are interrupted cuts, the use of coolant holes which direct the coolant radially outward or aslant to the tool is practically useless in furnishing fluid to the small tip because it flies out through the openings in the casting and never reaches the small portion of the tip. Thus, there are numerous features and advantages which flow from the construction which not only provides a locking drive but also a greater bonding area and a greatly improved flow characteristic for coolant.

It will be apparent, of course, that the tip can be made of solid tungsten carbide or a similar hard material and also from tool steel or high speed steel if desired. The present day equipment which permits very rapid brazing makes the reamer practically a replaceable part so that should one tip be ground away by reason of frequent sharpenings or destroyed by accident, the same shank can be used again with another tip. The direct engagement between the tip and the shank provides a positive drive relationship; and in severe conditions when the brazed joint might become softened by abnormal heat due to a momentary cut-off of the coolant, the parts will continue to drive and there can be no destruction or slipping.

In the appended claims, I have attempted to delineate the novelty of my device over known prior art for the purpose of defining the protected area as well as notifying the public relative to the unprotected area. However, I do intend by this claiming to cover any colorable variations, reversal of parts, or equivalents of the device which are within the scope and spirit of this disclosure and not anticipated by the prior art.

What is claimed as new is as follows:

1. In a hole enlarging and finishing tool such as a reamer of the type having a shank with an axial coolant passage and a bit bonded to said shank, that improvement which comprises:
   (a) an elongate bit having a shank end and a cutting end and a relatively large flute with a cutting edge along one axial side continuing in a radial edge extending inwardly from the periphery of the bit at the cutting end, and a land extending circumferentially from said flute forming a bearing surface for said tool, said land having leading and trailing axial surfaces extending along leading and trailing edges thereof and being relieved slightly between said surfaces, the leading surface being slightly smaller in diameter than the trailing surface of said land, and a relatively shallow axial surface flute formed on said land from one end to the other, between said leading and trailing surfaces, and
   (b) a shank having a coolant passage terminating in a recess to receive a portion of one end of the bit opposite the cutting end, the walls of said shank adjacent said recess having axial projections to insert into and overlie said flutes adjacent the surface of said bit to create a mechanical interlock for a torque drive between said shank and said bit and to direct coolant down said flutes to the cutting end of said bit.

2. In a hole enlarging and finishing tool such as a reamer of the type having a shank with an axial coolant passage and a bit bonded to said shank, that improvement which comprises:
   (a) an elongate bit having a shank end and a cutting end and a relatively large flute with a cutting edge along one axial side continuing in a radial edge extending inwardly from the periphery of the bit at the cutting end, and a land extending circumferentially from said flute forming a bearing surface for said tool, said land having leading and trailing axial surfaces extending along leading and trailing edges thereof and being relieved slightly between said surfaces, the leading surface being slightly smaller in diameter than the trailing surface of said land, and a relatively shallow axial surface flute formed on said land from one end to the other, between said leading and trailing surfaces, and
   (b) a shank having a coolant passage terminating in a recess to receive a portion of one end of the bit opposite the cutting end, the walls of said shank adjacent said recess having an axial projection to insert into and overlie a portion of said shallow axial surface flute in said land adjacent the surface of said bit to create a mechanical interlock for a torque drive between said shank and said bit and to direct coolant to the relieved surface on said land and to the cutting end of said bit.

3. In a hole enlarging and finishing tool such as a reamer of the type having a shank with an axial coolant passage and a bit bonded to said shank, that improvement which comprises:
   (a) an elongate bit having a shank end and a cutting end and a relatively large flute with a cutting edge along one axial side continuing in a radial edge extending inwardly from the periphery of the bit at the cutting end, and a land extending circumferentially from said flute forming a bearing surface for said tool, said land having leading and trailing axial surfaces extending along leading and trailing edges thereof and being relieved slightly between said surfaces, the leading surface being slightly smaller in diameter than the trailing surface of said land, and a relatively shallow axial surface flute formed on said land from one end to the other, between said leading and trailing surfaces, and
   (b) a shank having a coolant passage terminating in a recess to receive a portion of one end of the bit opposite the cutting end, the walls of said shank adjacent said recess projecting axially over a portion of said shallow axial surface flute to direct coolant to the relieved surface of said land and to the cutting end of said bit.

No references cited.

WILLIAM W. DYER, JR., *Primary Examiner.*